United States Patent
Schubert

(10) Patent No.: US 9,417,060 B1
(45) Date of Patent: Aug. 16, 2016

(54) X-RAY THEODOLITE

(71) Applicant: American Science and Engineering, Inc., Billerica, MA (US)

(72) Inventor: Jeffrey R. Schubert, Somerville, MA (US)

(73) Assignee: American Science and Engineering, Inc., Billerica, MA (US)

(*) Notice: Subject to any disclaimer, the term of this patent is extended or adjusted under 35 U.S.C. 154(b) by 157 days.

(21) Appl. No.: 14/331,764

(22) Filed: Jul. 15, 2014

Related U.S. Application Data

(60) Provisional application No. 61/858,252, filed on Jul. 25, 2013.

(51) Int. Cl.
*G01N 23/203* (2006.01)
*G01B 15/00* (2006.01)
*G01V 5/00* (2006.01)

(52) U.S. Cl.
CPC .............. *G01B 15/00* (2013.01); *G01V 5/0025* (2013.01)

(58) Field of Classification Search
CPC ..... G01N 23/00; G01N 23/20; G01N 23/203; G01N 23/201; G01V 5/0025; G01B 15/00; G01B 21/02; G01B 21/04
USPC ................................................ 378/70, 86, 87
See application file for complete search history.

(56) References Cited

U.S. PATENT DOCUMENTS

| | | | |
|---|---|---|---|
| 3,243,589 A * | 3/1966 | Sinclair ............... | G01N 23/203 250/363.01 |
| 6,081,580 A * | 6/2000 | Grodzins ............... | G01N 23/04 378/54 |
| 6,282,260 B1 | 8/2001 | Grodzins ........................ | 378/87 |

\* cited by examiner

*Primary Examiner* — Jurie Yun
(74) *Attorney, Agent, or Firm* — Sunstein Kann Murphy & Timbers LLP

(57) ABSTRACT

Methods and apparatus for determining the distance to a specified point or distances between specified points on one or more objects, where the specified points are obscured behind an opaque barrier and cannot be viewed. Specified points are illuminated with penetrating radiation from two or more successive locations, and scattered radiation from the specified points is detected, and distance is calculated based on illumination angles. The apparatus has a source of penetrating radiation, a beam scanner for directing the penetrating radiation, a detector for detecting scattered radiation, and a processor for calculating the distance.

6 Claims, 2 Drawing Sheets

X-RAY THEODOLITE

The present application claims priority from U.S. Provisional Patent Application, Ser. No. 61/858,252, filed Jul. 25, 2013, which is incorporated herein by reference.

TECHNICAL FIELD

The present application relates to the field of X-ray measurement, and, more particularly, to measurement of distances using X-ray backscatter imaging.

BACKGROUND OF THE INVENTION

Optical surveying instruments, such as a theodolite, may be used, within the visible portion of the electromagnetic spectrum, to measure a distance to a specified point, or one or more distances between specified points in a field of view, such as different points on an object or landscape feature. However, the need exists, in various circumstances, to measure a distance to a specified point, or distances between specified points on one or more objects, where one or more of the specified points cannot be viewed because they are obscured behind an opaque barrier such as a wall or an outer surface of a device.

The use of penetrating radiation and one or more detectors to detect scattered radiation and provide imaging of hidden objects has been described, for example, in U.S. Pat. No. 6,282,260 to Grodzins, issued Aug. 28, 2001, the content of which is incorporated herein by reference. The Grodzins '260 Patent, however, fails to teach how to obtain information with regard to distances between specified points in a hidden object.

SUMMARY OF EMBODIMENTS OF THE INVENTION

In a first embodiment of the invention, a method is provided for ascertaining a distance between two scattering points. In accordance with the method, two scattering points are illuminated with penetrating radiation from a first location and scattered radiation from the two points is detected, then these two points are illuminated from a second location and scattered radiation is detected again, and then the distance between the two scattering points is calculated on the basis of illumination angles.

In accordance with another embodiment of the invention, there is provided a method for determining a distance to a scattering point. In accordance with the method, a scattering point is illuminated with penetrating radiation from a first location and scattered radiation from the scattering point is detected, then the scattering point is illuminated from a second location and scattered radiation is detected, and then the distance to the scattering point is calculated based on illumination angles.

In accordance with a further embodiment of the invention, an apparatus is provided for ascertaining a distance between two scattering points. The apparatus has a source of penetrating radiation for illuminating angular regions including the scattering points from more than one location, a beam scanner for directing the penetrating radiation, and a detector arrangement for detecting scattered radiation from the scattering points. Additionally, the apparatus has a processor for calculating the distance between the two scattering points based on illumination angles.

In accordance with alternate embodiments of the invention, the source of penetrating radiation may be an X-ray source.

BRIEF DESCRIPTION OF THE FIGURES

The foregoing features of the invention will be more readily understood by reference to the following detailed description, taken with reference to the accompanying figures, in which.

DETAILED DESCRIPTION OF EMBODIMENTS OF THE INVENTION

Definitions

Figure 1:
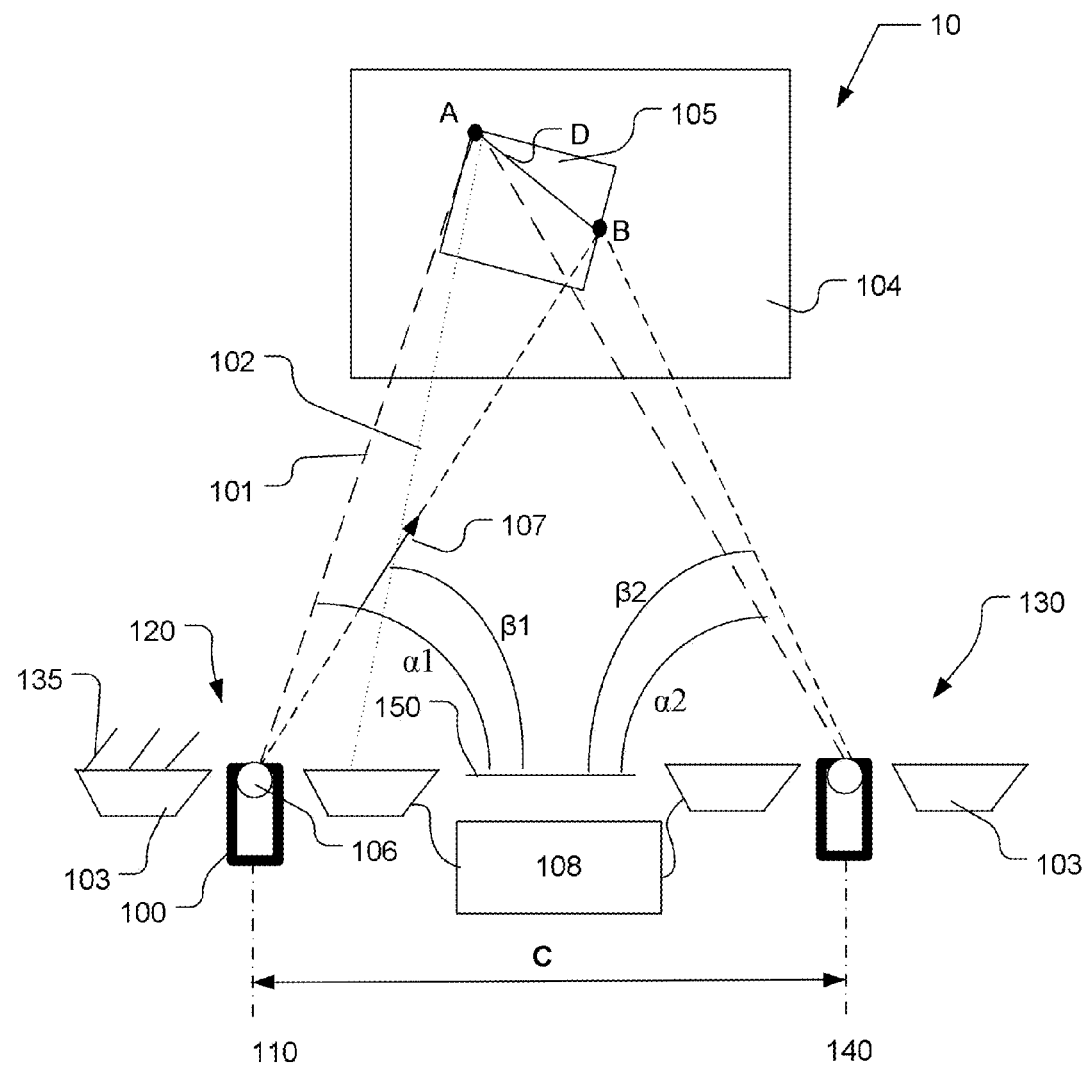
FIG. 1 is a schematic side view of an X-ray measurement apparatus illuminating a hidden object from a first location and a second location in accordance with a preferred embodiment of the present invention.

In the present description, and in any appended claims, the term "penetrating radiation" shall refer to any electromagnetic radiation that can pass through a material. In preferred embodiments of the invention, the penetration radiation is X-ray or gamma ray radiation.

The term "scattering point" shall refer to a location in space containing a scatterer that scatters penetrating radiation into a range of directions.

The term "image" shall refer to any multidimensional representation, whether in tangible or otherwise perceptible form, or otherwise, whereby a value of some characteristic (such as fractional transmitted intensity through a column of an inspected object traversed by an incident beam, in the case of X-ray transmission imaging) is associated with each of a plurality of locations (or, vectors in a Euclidean space, typically $\mathcal{R}^2$) corresponding to dimensional coordinates of an object in physical space, though not necessarily mapped one-to-one thereonto. An image may comprise an array of numbers in a computer memory or holographic medium. Similarly, "imaging" refers to the rendering of a stated physical characteristic in terms of one or more images.

The term "source" shall signify a device that produces penetrating radiation such as X-rays, including, without limitation, X-ray tubes, or Bremsstrahlung targets impinged upon by energetic particles, without regard for the mechanism used to generate the X-rays, and including, without limitation, structures used to form or steer a beam of the penetrating radiation.

As used herein, the term "hidden" is used without limitation to indicate that an object need not be detectable in the visible portion of the spectrum in order for the present invention to operate. Of course, the functionality of the present invention is applicable as well in instances where an object is visible.

As used herein, "illuminating an angular region" shall refer to scanning a pencil beam over a specified range of angles in one or two dimensions, the projection of which on a plane is a line or an area, respectively.

An X-ray measurement apparatus, in accordance with one embodiment of the present invention, and as designated generally by numeral 10, is described with reference to FIG. 1. A source 100 emits a beam of penetrating radiation 101 from a first location designated generally by numeral 120. Penetrating radiation source 100 is preferably an X-ray tube. However, other sources of penetrating radiation known in the art are within the scope of the present invention. Beam 101 of penetrating radiation is preferably, but not limited to, X-ray radiation, and may include gamma ray radiation. In one embodiment of the present invention, beam 101 of penetrating radiation is a pencil beam of X-ray radiation. In one embodiment of the invention, source 100 includes a scanner (depicted schematically by circle 106) for scanning a direction 107 of pencil beam 101. A "scanner" refers to any mechanism, such as a rotating hoop or chopper wheel, used to vary the direction of beam 101 of penetrating radiation.

Where beam 101 illuminates a hidden object 105 and a surrounding medium 104, beam 101 is scattered by the respective matter through the process of Compton scattering. Backscattered radiation, emitted by scattering points A and B in all directions, is designated, for heuristic purposes of depiction, by a dotted ray labeled 102. Hidden object 105 need not actually be hidden, and is so designated herein for heuristic purposes only. Scattered radiation 102 is detected by one or more detectors 103. Any radiation detection technology known in the art may be employed as the detector of the present invention. Preferably, one or more backscatter detectors are used for detecting backscattered X-rays 102. Backscatter detectors 103 are electrically coupled to one or more processors 108 which collect and process output signals from scatter detectors 103 to generate an image 201 (as shown in FIG. 2A) of hidden object 105 and surrounding 104 as pencil beam 101 is swept to illuminate successive scatterers such as are disposed at scattering points A and B.

Source 100 is then moved to a second location designated generally by numeral 130. It is to be understood that a second source located at second location 130 may function equivalently to source 100 being moved, and the two circumstances are referred to herein interchangeably. It is also to be understood that which the two source positions and respective detectors are shown as coplanar, that, too, is by way of example only. From the new position at second location 130, pencil beam 101 illuminates hidden object 105 and surrounding 104 for a second time. Backscatter radiation 102 is detected by detectors 103. Processor 108 then collects signals from detectors 103 and reconstructs an image 202 (as shown in FIG. 2B) of hidden object 105 and surrounding 104.

Figure 2A:
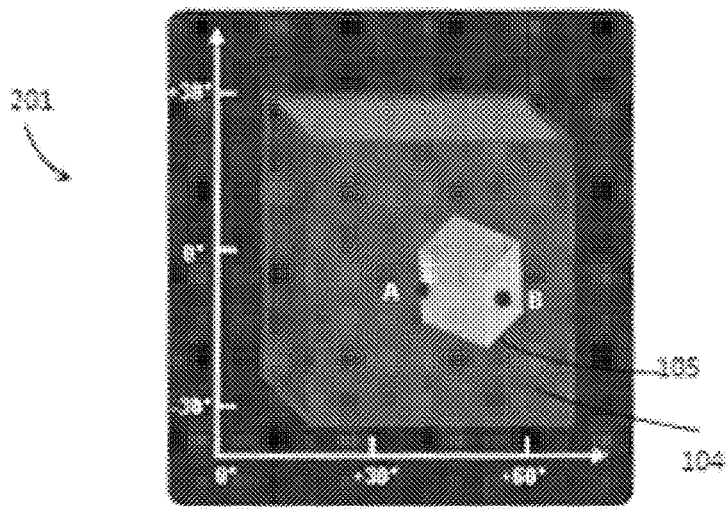
FIG. 2A is an image of a hidden object and its surrounding generated by an X-ray measurement apparatus from a first location in accordance with a preferred embodiment of the present invention.

Referring now to FIG. 2A, points A and B are two specified scattering points of interests on hidden object 105 and correspond to points A and B on hidden object 105 in FIG. 1.

Figure 2B:
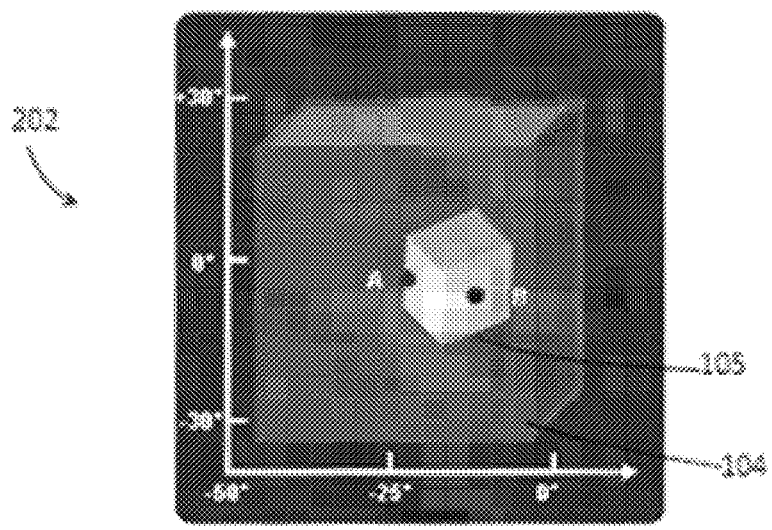
FIG. 2B is an image of a hidden object and its surrounding generated by an X-ray measurement apparatus from a second location in accordance with a preferred embodiment of the present invention.

Referring now to FIG. 2B, points A and B are the same specified scattering points of interests on hidden object 105 and correspond to points A and B on hidden object 105 in FIG. 1.

As indicated in FIG. 1, D is the distance between points A and B, and it is easily calculated once respective illumination angles $\alpha 1$ and $\alpha 2$ of point A and illumination angles $\beta 1$ and $\beta 2$ of point B and known, along with distance C between a first source displacement 110 and a second source displacement 140 relative to a fiducial reference. After these parameters are determined, simple trigonometry, well within the ken of a person of ordinary skill in the art, can be used to calculate the distance between a fiduciary locus such as baseline 150 and points A and B, or the distance D between points A and B.

Thus, for example, the right distance from baseline 150 to point A is readily seen to be $$\frac{C\tan(\alpha 1)\tan(\alpha 2)}{\tan(\alpha 1)+\tan(\alpha 2)},$$

and, mutans mutandis, for point B, exchanging $\beta$ for $\alpha$. The lateral displacement of point A relative to fiducial position 140 is $$\frac{C\tan(\alpha 1)}{\tan(\alpha 1)+\tan(\alpha 2)},$$

and, correspondingly, for point B. The distance D between points A and B is the square root of the sum of the squares of the differences in axial and lateral displacement relative to baseline 150 and fiducial point 140.

In one embodiment of the present invention, the spectral energy content of penetrating radiation 101 may be varied to modify penetration to better discern objects including scattering point(s) of interest.

In another embodiment of the present invention, resolution of the images may be adjusted by varying the size of penetrating radiation beam 101, or by changing the focal spot size of the X-ray tube in source 100.

In another embodiment of the present invention, two penetrating radiation sources 100 may be applied, and are displaced in locations 110 and 140 with a known separation distance between the locations.

In a preferred embodiment of the present invention, once hidden object 105 including points of interest A and B has been located, a specified portion of images shown in FIG. 2A and FIG. 2B might be rescanned using higher resolution, and, possibly, a finer pixel mesh, in order to better locate the points of interest.

In another preferred embodiment of the present invention, signal-to-noise ratio (SNR) can be increased by rescanning only the region of interest within the images shown in FIG. 2A and FIG. 2B with a longer scan time per pixel.

In another preferred embodiment of the present invention, vanes 135 (shown in FIG. 1) may be deployed in front of backscatter detectors 103 to perform laminography, to limit image information to a particular depth and better reduce clutter around hidden object 105.

X-ray measurement apparatus 10 of the present invention may advantageously benefit conventional Explosive Ordnance Disposal (EOD)/Bomb Squad users by enabling one to estimate the size of an explosive charge within an opaque barrier, such as a vehicle or a wall. Measurements of width, height, and depth of the charge can be obtained, and an accurate measure of the volume of the explosive charge is feasible. Given that most explosives have specific densities in the range of 1.2-1.8, a reasonable estimate of the mass of explosive may be obtained.

X-ray measurement apparatus 10 is readily applicable to non-destructive testing, especially reverse engineering in the automotive and aerospace industries. It is also valuable as an alignment tool for mechanical components which are "hidden" inside of other components. It is also useful in camera systems.

In a preferred embodiment of the present invention, accuracy of measurement may be increased by taking multiple images, and combining the results of multiple low accuracy measurements. It is also possible to reposition X-ray measurement apparatus 10 to multiple locations, without necessarily having measurements of distances and angles between the different locations, and image multiple fixed landmarks, and then compute the distances and angles between all landmarks and imaging locations, although the computing required is much more complicated than with two imaging positions of known relationship to one another.

In another preferred embodiment of the present invention, even greater accuracy is achieved when X-ray measurement apparatus 10 is mounted to several independent platforms, and an easily imaged fiducial mark is also be mounted on each platform at the same location as the focal spot, such that each image produced contained not only the object of interest, but also of the fiducial markers on the other platforms. Maximum accuracy is achieved if the dual-position track constituted by positions 110 and 140 is mounted on such a set of platforms, so that the calculation would begin with known relationships between pairs of imaging positions.

Any method of determining a distance to a specified scattering point on hidden object 105 or distances between two or more scattering points on one or more hidden objects 105 using penetrating radiation as described herein is within the scope of the present invention.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for ascertaining a distance between two specified stationary scattering points, comprising:
    a. illuminating a first angular region including the two specified stationary scattering points with a first pencil beam of penetrating radiation emanating from a first location;
    b. detecting scattered radiation from the two specified stationary scattering points;
    c. illuminating a second angular region including the two specified stationary scattering points with a second pencil beam of penetrating radiation emanating from a second location, the second location displaced relative to the first location by a known distance;
    d. detecting scattered penetrating radiation from the two specified stationary scattering points; and
    e. calculating the distance between the two specified stationary scattering points based on illumination angles characterizing the two specified stationary scattering points as illuminated by the first and second pencil beams of penetrating radiation.

2. A method according to claim 1, wherein a visually opaque surface is disposed between the first location and each of the two specified stationary scattering points.

3. The method according to claim 1, wherein the steps of illuminating include scanning with at least one X-ray source.

4. A method for ascertaining a distance from an x-ray measurement apparatus to a specified stationary scattering point, the method comprising:
    a. illuminating an object that includes the stationary scattering point with a first pencil beam of penetrating radiation emanating from a first location;
    b. detecting scattered radiation from the stationary scattering point on the object;
    c. illuminating the object with a second pencil beam of penetrating radiation emanating from a second location displaced by a known distance relative to the first location;
    d. detecting scattered radiation from the stationary scattering point on the object; and
    e. calculating the distance from the x-ray measurement apparatus to the specified object based on illumination angles characterizing the stationary scattering point as illuminated by the first and second pencil beams of penetrating radiation.

5. An apparatus for ascertaining a distance between two specified stationary scattering points, comprising:
    a. a source of penetrating radiation adapted to illuminate a plurality of angular regions including the two specified stationary scattering points, each angular region illuminated from a plurality of successive locations;
    b. a beam scanner for directing a pencil beam of penetrating radiation over each angular region from each successive location of the source;
    c. a detector for detecting scattered radiation from the two specified stationary scattering points; and
    d. a processor for calculating the distance between the two specified stationary scattering points based on illumination angles characterizing the two points as illuminated by the pencil beam of penetrating radiation at each successive location of the source.

6. The apparatus according to claim 5, wherein the source of penetrating radiation is an X-ray source.

* * * * *